(12) United States Patent
Futoransky et al.

(10) Patent No.: US 8,356,353 B2
(45) Date of Patent: Jan. 15, 2013

(54) SYSTEM AND METHOD FOR SIMULATING COMPUTER NETWORK ATTACKS

(75) Inventors: Ariel Futoransky, Buenos Aires (AR); Fernando Carlos Miranda, Buenos Aires (AR); Jose Ignacio Orlicki, Buenos Aires (AR); Carlos Emilio Sarraute Yamada, Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 601 days.

(21) Appl. No.: 12/147,282

(22) Filed: Jun. 26, 2008

(65) Prior Publication Data

US 2009/0007270 A1 Jan. 1, 2009

Related U.S. Application Data

(60) Provisional application No. 60/946,252, filed on Jun. 26, 2007.

(51) Int. Cl.
*G06F 21/00* (2006.01)
(52) U.S. Cl. .......................................... 726/25; 726/23
(58) Field of Classification Search .................. None
See application file for complete search history.

(56) References Cited

U.S. PATENT DOCUMENTS

| | | | |
|---|---|---|---|
| 2003/0014669 A1* | 1/2003 | Caceres et al. | 713/201 |
| 2003/0182582 A1* | 9/2003 | Park et al. | 713/201 |
| 2003/0212908 A1* | 11/2003 | Piesco | 713/201 |
| 2005/0193430 A1* | 9/2005 | Cohen et al. | 726/25 |
| 2008/0046393 A1* | 2/2008 | Jajodia et al. | 706/50 |
| 2008/0222731 A1* | 9/2008 | Dowd et al. | 726/25 |
| 2008/0244747 A1* | 10/2008 | Gleichauf et al. | 726/25 |

* cited by examiner

*Primary Examiner* — Gilberto Barron, Jr.
*Assistant Examiner* — Malcolm Cribbs
(74) *Attorney, Agent, or Firm* — Peter A. Nieves; Sheehan Phinney Bass + Green PA

(57) ABSTRACT

The present invention provides a system and method for providing computer network attack simulation. The method includes the steps of: receiving a network configuration and setup description; simulating the network configuration based on the received network configuration; receiving at least one confirmed vulnerability of at least one computer, machine, or network device in the simulated network; receiving a method for compromising the confirmed vulnerability of the at least one computer, machine, or network device; and virtually installing a network agent on the at least one computer, machine, or network device, wherein the network agent allows a penetration tester to execute arbitrary operating system calls on the at least one computer, machine, or network device.

11 Claims, 4 Drawing Sheets

SYSTEM AND METHOD FOR SIMULATING COMPUTER NETWORK ATTACKS

CROSS-REFERENCE TO RELATED APPLICATION

This application claims priority to U.S. Provisional Application entitled, "SIMULATION OF COMPUTER NETWORK ATTACKS," having Ser. No. 60/946,252, filed Jun. 26, 2007, which is entirely incorporated herein by reference.

FIELD OF THE INVENTION

The present invention is generally related to computer security, and more particularly is related to computer and computer network attack simulation.

BACKGROUND OF THE INVENTION

The statements in this section merely provide background information related to the present disclosure and may not constitute prior art. In computer usage today, computer security is no longer a convenience, but instead, a requirement. In order to understand the security posture of an organization, it is necessary to approach it with a holistic view and consider network assets simultaneously.

In the past, it has been a standard practice to make a security assessment before deploying a new network or modifying an existing network and to have periodic assessments over networks that are in production. Penetration tests are one of the preferred methods for security assessment. A penetration test is a process by which a security auditor attempts to gain unauthorized access to the computer system or network. New trends in network technologies make penetration testing more difficult, specifically, networks have grown in size, the networks implement a wider variety of configurations and more complex configurations, and the networks include newer devices (e.g., embedded devices). These new trends in network technologies have created new flows of information and control, and therefore new attack vectors. As a result, the job of making these security assessments has become more difficult and challenging.

There are many reasons why a Chief Security Officer or other party might not want to have a penetration test (pen-test) against his network, or might not be able to perform a penetration test. As an example, this may be either because, he may not want to risk disrupting the availability of the network, or because the network has not been implemented yet. For example, it is common in Web application development or SCADA (Supervisory Control and Data Acquisition, which are industrial control systems), to duplicate the production environment on a "staging environment" accurately mimicking or mirroring the first to anticipate changes and their impact. When this is done, all changes are first made in the staging environment, the security assessments and other functional tests are done in the staging environment and these changes are only deployed in the production environment once all the tests are cleared.

Staging is a good practice, which is very difficult to adopt in the case of network security due to several reasons. Presently, it is not possible to deploy computer networks of hundreds of computers in arbitrary topologies and configurations efficiently. Also, one cannot duplicate the behavior of a complete standard sized network including the elements mentioned, the security holes, and their consequences. This is because, one would be required to buy two times the hardware and software licenses, and there are no means for implementing the installation and configuration automatically. Of course, there are other reasons why it is not possible to deploy computer networks of hundreds of computers in arbitrary topologies and configurations efficiently.

There are various reasons why one would need to simulate computer networks so that they can be attacked. As an example, presently, there are no programs for teaching penetration testing or other forms of computer security and this turns out to be a difficult job. Education programs would require providing vulnerable scenarios with which students can experiment. These pedagogical objectives also require a rapid, flexible and reproducible configuration of scenarios, not available in real installations or in virtualized network environments designed for more general purposes.

A second example of a reason why one would need to simulate computer networks so that they can be attacked is due to the design of attack tools and refinement of older tools requiring network simulation. Explicitly, in order to test an attack technology it is necessary to make attack experiments against different targets. However, providing these targets is costly and inefficient with the tools of today. For example, there might be a desire to design an attack-planning algorithm, which is an interactive algorithm that receives as input a connection to a network, a target, and a set of actions with their requirements, and iteratively constructs and executes an attack which achieves the target.

In view of the shortcomings discussed above, there is a need for a system and method for simulating computers and computer networks that takes an entirely fresh approach and overcomes the drawbacks of the conventional techniques. Thus, a heretofore unaddressed need exists in the industry to address the aforementioned deficiencies and inadequacies.

SUMMARY OF THE INVENTION

Embodiments of the present invention provide a system and method for providing computer network attack simulation. Regarding the method, one embodiment of such a method, among others, can be broadly summarized by the following steps: receiving a network configuration and setup description; simulating the network configuration based on the received network configuration; receiving at least one confirmed vulnerability of at least one computer, machine, or network device in the simulated network; receiving a method for compromising the confirmed vulnerability of the at least one computer, machine, or network device; and virtually installing a network agent on the at least one computer, machine, or network device, wherein the network agent allows a penetration tester to execute arbitrary operating system calls on the at least one computer, machine, or network device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the FIG. 1 is a schematic diagram illustrating a network attack simulation system in accordance with the present invention.

DETAILED DESCRIPTION

The present system and method provides for the simulation of networks of computer systems with vulnerabilities and allows a user to perform attacks against the computers and networks of computers, through use of a single computer. A realistic experience is provided from the standpoint of the attacker. The system and method assist in the design of secure networks and in the design of attack-related technologies. Specifically, since the system and method can help its users to assess the security of imaginary (i.e., simulated) scenarios, the system and method can be used to design secure scenarios. Also, the system and method allow a user to design attack technologies by providing the user with the capability of testing these attack technologies against arbitrary simulated networks, and comparing these experiments and the functionalities present in a penetration testing framework.

Figure 1:
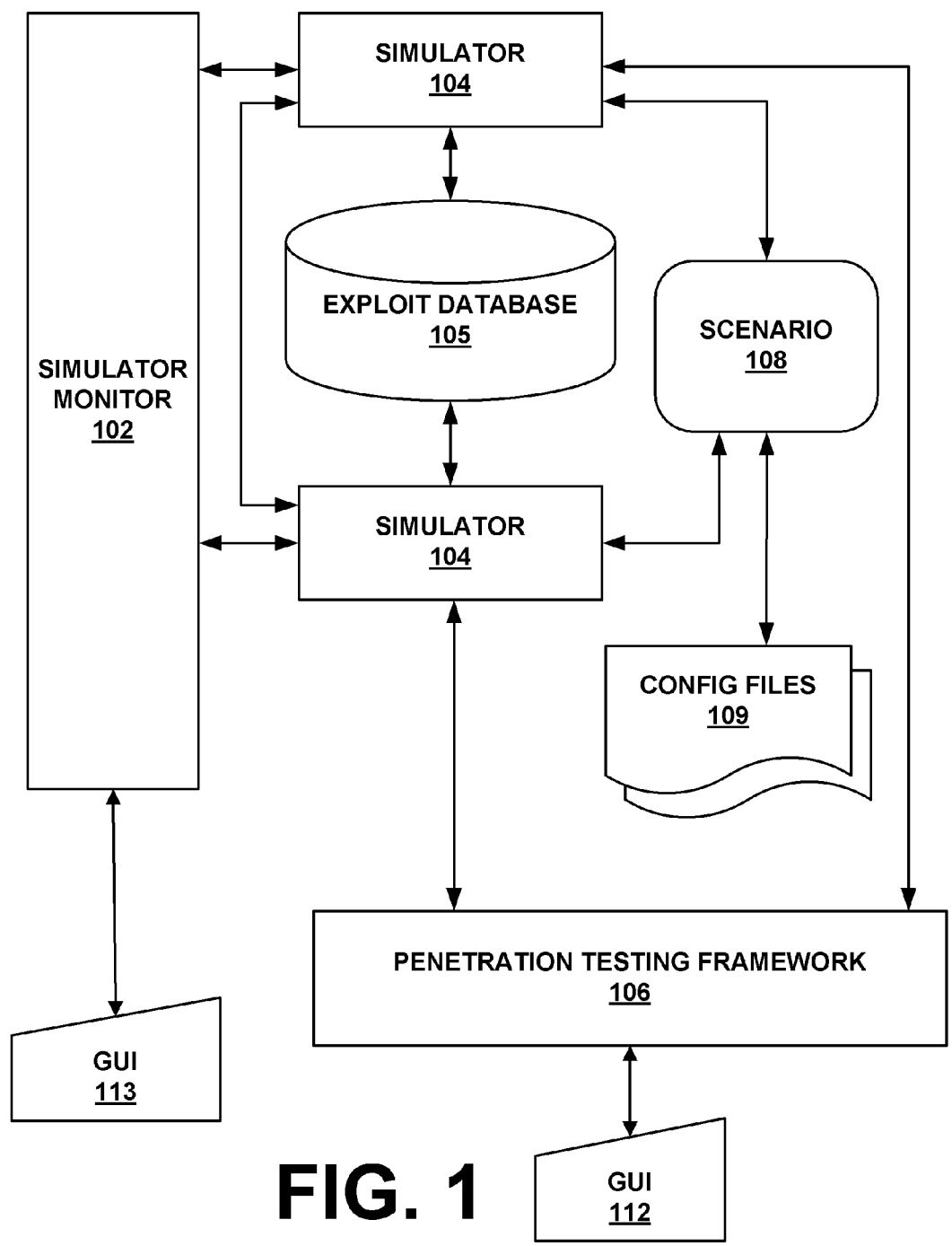

An example of the present network attack simulation system 100 is provided by FIG. 1. As is shown by FIG. 1, the system 100 contains a simulator monitor 102, one or more simulators 104, an exploit database 105, a penetration testing framework 106, a scenario storage 108 and a set of configuration files 109. The system 100 also contains a penetration testing framework graphical user interface 112 for allowing a user of the system to interact with the penetration testing framework 106.

It should be noted that each portion of the system 100 may be located within a single computer or may be located at separate locations, where each portion is capable of communicating with other portions of the system 100 as described herein. As an example, the simulator monitor 102, the simulators 104, and the penetration testing framework 106 may be provided as programs located within a single computer. In addition, the exploit database 105, the scenario storage 108 and the configuration files 109 may be located within the computer. It should also be noted that the exploit database 105, the scenario storage 108, and the configurations files 109 may be located either in the same storage device or in separate storage devices.

Simulator

In accordance with the present invention, a simulator 104 is a virtual machine, or software, within the system 100 capable of simulating the features of multiple computers and multiple networks, connections within and between the multiple computers and multiple networks, and tasks of the multiple computers and multiple networks. The simulator contains code that allows it to answer to system calls. System calls are described in detail herein.

To perform a simulation, the simulator 104 reads a configuration file 109. The configuration file 109 defines properties of computers, properties of machines, properties of networking devices, and properties of applications. Machines may include, but are not limited to, workstations or servers running a Windows operating system, a Macintosh operating system, or one of a few Linux and other Unix operating systems. In addition, examples of applications may include, but are not limited to, network protocols, and general computer software applications. Further, networking devices may include, but are not limited to, a router, a proxy, a firewall, a hub, a switch, or an intrusion detection system.

The configuration files 109 describe file systems for machines, their open/closed ports, a list of processes that run on startup, a routing table, and a list of open services, such as, but not limited to, Web, FTP, TELNET, and secure shell. It should be noted that multiple virtual machines are provided for by the configuration files 109.

Some of the features of the configuration files 109 can be taken out of templates. Specifically, templates may be provided for the file system of each operating system. The configuration file includes, for each computer, a pointer to the place where the file system of the simulated computer is located, that is, a directory in the computer where the simulator runs which contains all the directories for the simulated computer. Since using one copy per simulated computer has very large storage requirements, the simulator includes an optimization by which it uses the same template for several machines (this means that many of the pointers mentioned above will point to the same directory). However, if one of the simulated computers that shares a template must make a change in its file system, then the simulator will automatically create a separate copy of the file system and make these changes on this new copy, without altering the shared file system.

As an example of the abovementioned, the file system in a Windows XP operating system that has a directory "C:\Windows" which depends on the version of the operating system, and directories "C:\Documents and Settings\Local Settings; C:\Documents and Settings\Application data" that depend on the OS version and the configuration files for some programs that run in this computer. Similarly, some processes run on the startup of a computer according to the computer operating system version.

It should be noted that in accordance with the present invention, the architecture of the system 100 allows for more than one simulator 104, although a single simulator 104 may be provided within the system 100. Each simulator 104 may run within a single computer or each simulator 104 may run within a separate real computer. For exemplary purposes, FIG. 1 illustrates two simulators 104 located within a single computer. Due to processing resources and dependent upon a number of computers being simulated within a network, it may be beneficial to have more than one simulator 104 within system 100, where each additional simulator is running in a new computer. Specifically, in accordance with the present invention, it may be possible to simulate thousands of computers with a single computer having a simulator 104. If thousands more computers need to be simulated, a second simulator 104 running in a second computer may be necessary.

A simulator 104 begins a simulation from a snapshot of a network scenario, which the simulator 104 initially creates from the configuration files 109. It is information received from configuration files that creates the initial snapshot of the scenario. A snapshot of the network scenario, which provides the current state or status of the network and components therein, is stored, maintained, and continuously updated within the scenario storage 108. The network scenario describes, among other properties of a network, which computers are in the simulated network, what applications or services are run by computers, what operating systems the computers run, and how the computers are networked.

Figure 2:
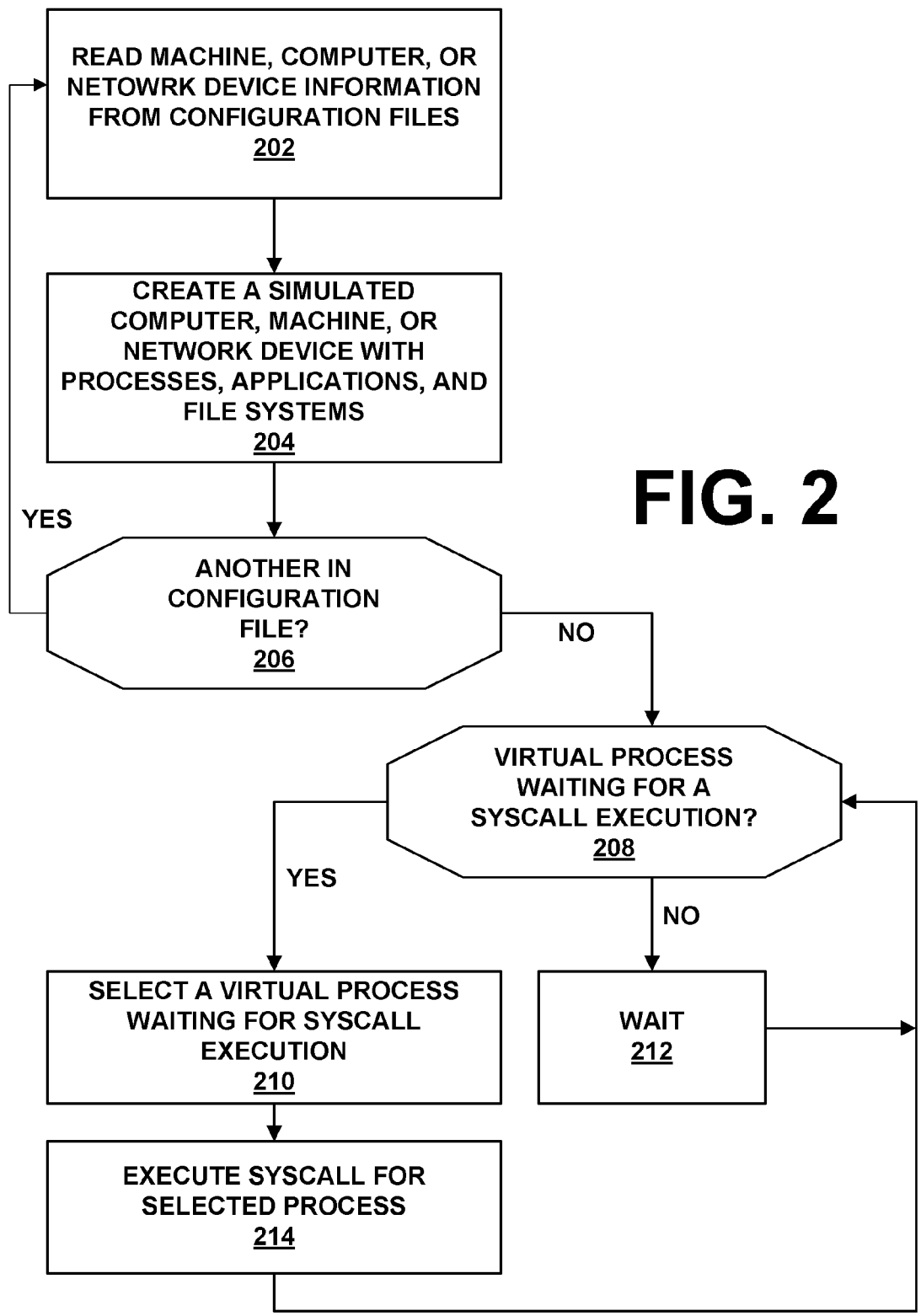
FIG. 2 is a flow chart illustrating functionality performed by the simulator in creating a virtual network for testing.
Figure 3:
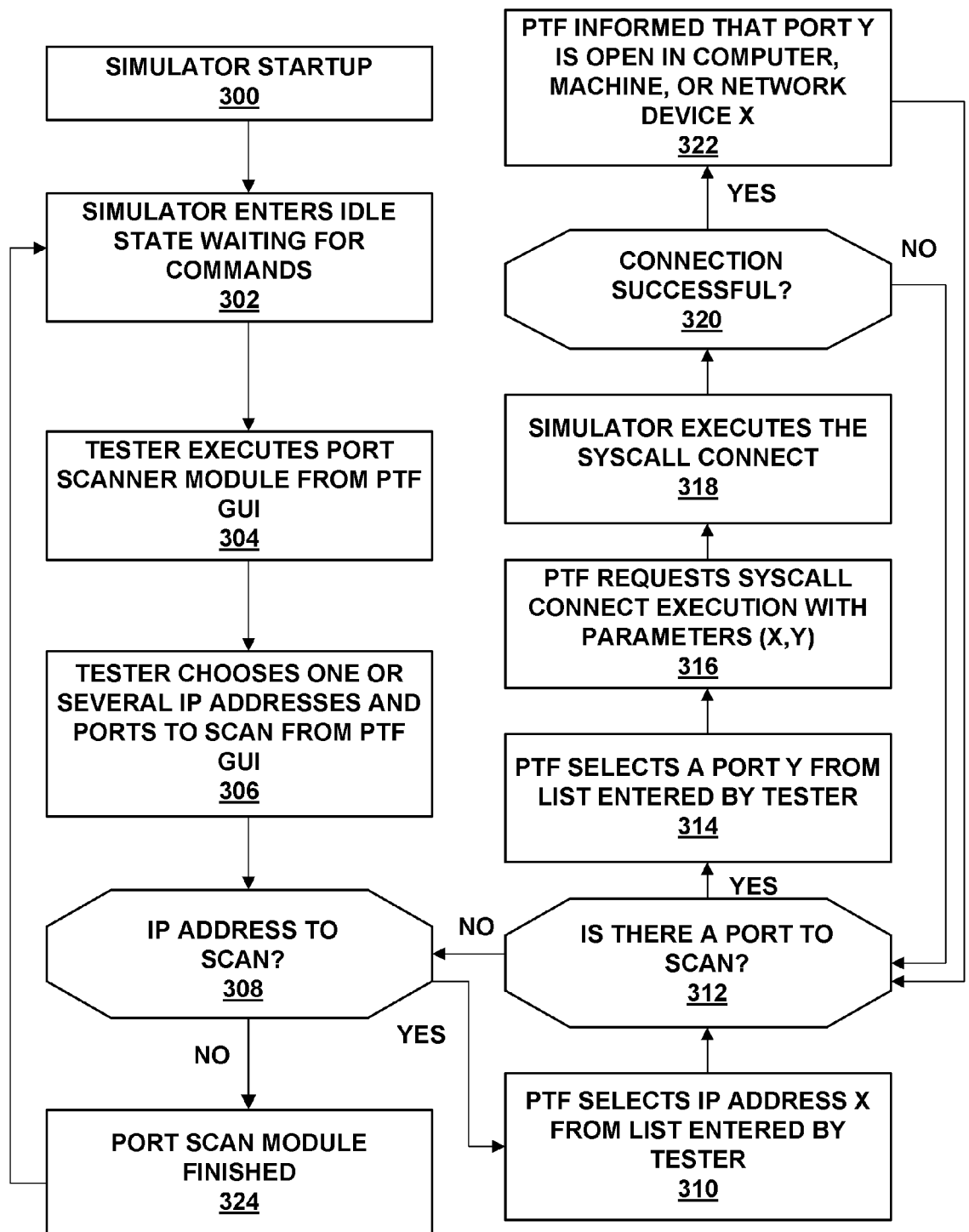
FIG. 3 is a flow chart illustrating a port scan process necessary for virtual network testing.
Figure 4:
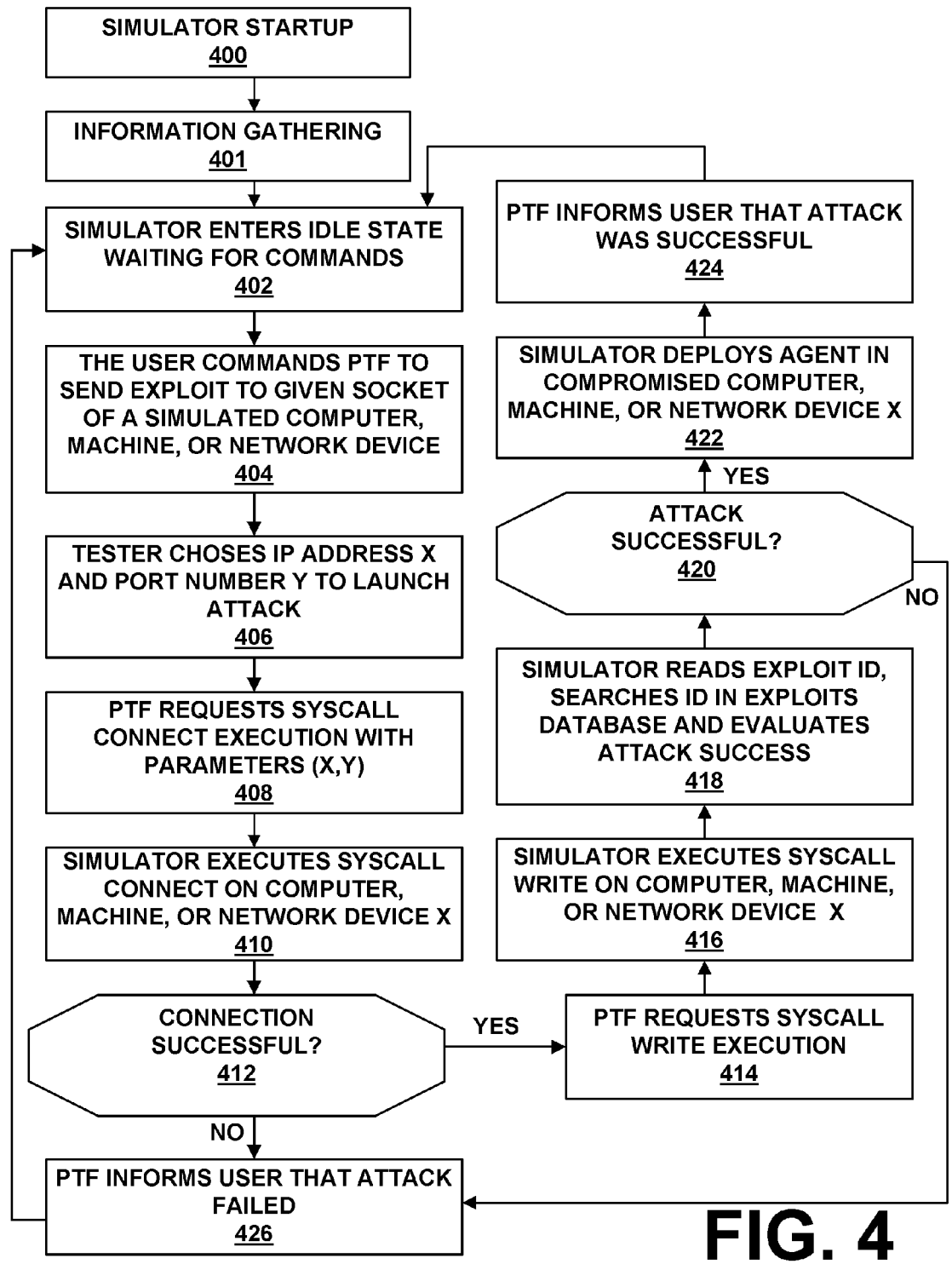
FIG. 4 is a flow chart illustrating a simulated exploit process performed by using the present system.

As the attack simulation progresses and modifications are made to the simulated network, in accordance with the simulator 104, the network scenario is updated within the scenario storage 108. As a result, an updated copy of network properties, and the current state or status of the network, in accordance with the network scenario is continuously available from the scenario storage 108. The simulator 104 continues to run processes for the computers in the network scenario, some of which might be commanded by the penetration testing framework 106, and this causes the scenario storage 108, which stores a scenario snapshot, to change. FIGS. 2, 3, and 4 are flow charts further illustrating functionaries performed by the simulator 104, and is described in detail herein.

Simulator Monitor

Returning to FIG. 1, the simulator monitor 102 is responsible for the management and administrative operations of each simulator 104, including administrative tasks such as starting and/or stopping a simulator 104 instance. The simulator monitor 102 also provides information for the usage and performance of each simulator 104. The information includes operational information and statistical performance measurements, such as, but not limited to, RAM memory used, CPU usage, what processes is the simulator running, and what are the system calls involved in these processes. A user of the present system 100 can view the information provided by the simulator monitor 102 through a graphical user interface (GUI) 113 connected to the simulator monitor 102.

In accordance with the present invention, the simulation monitor 102 maintains an accurate count of how many simulators 104 are running within the system 100 and in what computers the simulators 104 are running. In addition, the simulation monitor 102 maintains a count of what portion of the network is simulated. As an example, the simulation monitor 102 states which machines defined in the configuration file are simulated in each simulator.

Scenario Storage

As previously mentioned, the scenario storage 108 contains a snaps hot of a virtual scenario 108 defining the instantaneous status of the simulation. The scenario involves a set of devices and their present status, where a device can be any of a server, workstation, network device (e.g., firewall, router or hub), or another device that takes part of a real network.

A scenario is composed of a set of machines, networking devices, and sensors, each running services and applications and with a given file system. Devices and machines are configured according to certain prescribed rules and each machine is configured independently.

Exploit Database

The exploit database 105 stores a list of exploit identifiers and their properties. Explicitly, this database will answer queries from the simulator of the sort inquiring as to whether this version of the operating system or application is vulnerable to that exploit.

An exploit is a piece of code that attempts to compromise a workstation or desktop via a specific vulnerability. According to the literal meaning of an exploit, the exploit takes advantage and makes use of a hidden functionality. When used for actual network attacks, exploits execute payloads of code that can alter, destroy, or expose information assets.

For any real exploit, we can extract its name and properties and create an entry in the Exploit Database. Additionally, the user can create artificial simulated exploits (that is, simulated exploits that have no real counterpart), define their properties and use this to make WHAT-IF experiments (e.g., what would happen if an attacker used an exploit against this component of my network?).

If a simulated exploit exists that may be used on the simulated network, the simulator 104 will query the exploit database 105 to check whether the outcome of this exploit should be successful or not. If the outcome of this exploit should be successful, the simulator allows the attacker using the present system and method to use the simulated exploit to compromise the application, operating system, or other vulnerable point of the simulated network. A simulated exploit is simply a string that identifies an exploit, e.g., the string "Microsoft WINS Exploit (MS08-034)" identifies an exploit for vulnerability CVE-2008-1451, and the exploit database contains an entry that has the identifier "Microsoft WINS Exploit (MS08-034)," and its properties state that affects certain Windows operating systems with UDP port 42 open and it is successful with ninety percent (90%) probability in these conditions, and with ten percent (10%) probability it crashes the system, under other conditions it simply does nothing.

Penetration Testing Framework

The penetration testing framework 106 is an external system that interacts with a simulated scenario sending system call request through a communication channel implemented by the simulators 104. In particular, the penetration testing framework 106 can be replaced by another penetration testing toolset (e.g., Metasploit framework) after some changes in order to be compliant with the simulator 104.

An example of a penetration testing framework is described in U.S. patent entitled, "Automated Computer System Security Compromise," by Caceres, et al., filed on Jan. 22, 2002, and having U.S. Pat. No. 7,228,566 (hereafter, "the '566 patent"), the disclosure of which is hereby incorporated by reference in its entirety. As stated within the '566 patent, a penetration test is performed to identify, analyze, exploit, and document security vulnerabilities in a target network. The penetration test may be executed by a console that may be, for example, a personal computer running Microsoft Windows 2000 Professional, Server, or Advanced Server operating systems. In accordance with the simulated network, the target network may be connected to a network, such as for example the Internet. In the case of such example, the console also would be connected to the Internet and would gain access to the target network through the Internet.

The target network may have a first target host, such as, for example, a firewall. The firewall is a security device that typically is the only host in the target network that is connected directly to the Internet. The target network may have a number of other hosts connected to it in the network simulation, all of which could be the eventual targets of the penetration test.

The console compromises the security measures protecting the first target host by executing a series of modules. The modules may be selected and initiated by the user. Alternatively, the console may execute a predetermined sequence of modules or may determine a sequence of modules to be executed based on the information gathered during penetration testing.

In the initial stage, typically, modules are executed to gather information about the first target host. For example, the console may execute a port scanner that analyzes the ports of the first target host and determines all of the services that are being run, such as an Internet Web server, an email server, a finger service, or other services. Further information might be acquired by running modules designed to exploit the services identified by the port scanner. For example, if the first target host is running a finger service, then that service will be targeted by a module to determine software version, user names, and other characteristics of the first target host. As a further example of an information gathering module, a network discovery module may be used to determine the number of hosts in the target network and the Internet Protocol (IP) address of each host.

Following execution of the information gathering modules, the console executes exploits to exploit security vulnerabilities in the first target host based on the information that has been retrieved. For example, information may be obtained regarding a firewall operating system being run on the first target host, such as the software brand and revision number. Based on this information, the console executes an exploit that has been written to take advantage of security vulnerabilities for that particular firewall, where the exploit has been stored in the penetration testing framework 106.

Once a service running on the first target host has been compromised, the console installs a remote agent on the first target host. The remote agent is a program that operates on the first target host to perform a number of functions, such as receiving and executing control commands and modules from the console and sending back information to the console.

Once the remote agent has been installed on the first target host, the remote agent is used by the console to gain access to the target network and compromise the security of the other hosts that make up the target network, such as the second target host. For example, the remote agent on the first target host executes exploits, such as those discussed above, or system calls received from the console to gather information and exploit other security vulnerabilities in the target network. To hosts connected to the target network, such commands or queries appear to originate from the first target host and therefore may be more readily accepted.

Once the security of the second target host has been compromised, the remote agent in the first target host installs a remote agent in the second target host. Each of the installed agents sends and receives modules, commands, and data from other installed agents, which is referred to as chaining. For example, the agent in the second target host receives modules and commands from the agent in the first target host, which, in turn, receives the modules and commands from the console. The agent in the second target host also sends data back to the agent in the first target host, which, in turn, sends the data back to the console.

The agent in the second target host executes the modules received from the upstream agents to gather information from and exploit security vulnerabilities in a third target host, in a manner similar to that discussed above. Once the security measures have been compromised, the agent in the second target host installs an agent in the third target host. The penetration of the target network may continue in this manner until all of the target hosts have been compromised or until the final target of the penetration testing has been compromised.

The term "exploiting security vulnerabilities", as used herein, is a broad concept that includes any means for gaining access to and/or obtaining information from a target host. The concept includes, without limitation, the execution of modules that are designed to take advantage of specific security vulnerabilities that have been identified in a target host. For example, the first target host may have been misconfigured by the owner in a manner that is detectable and allows installation of a remote agent. This concept also includes, without limitation, the execution of information gathering modules, such as port scanners and network discovery modules. This concept further includes, without limitation, the exploitation of security vulnerabilities of a target host that result from the compromise of other target hosts. For example, once a remote agent has been installed in the first target host, it may be possible to gather information and install remote agents on other target hosts due to hierarchies of trust within the target network. This concept further includes, without limitation, obtaining access to a target host by virtue of a lack of security features or measures.

A simulator 104 begins from a snapshot of a scenario within the scenario storage 108, as defined in the configuration files 109, and makes modification to the scenario as the simulation progresses. The simulator runs processes for the computers in the scenario, some of which may be commanded by the penetration testing framework 106, thereby causing the scenario snapshot to change.

Reference is now made to the flow chart 200 of FIG. 2, which further illustrates functionality performed by the simulator 108 in creating a virtual network for testing, in accordance with the present invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, the simulator 104 reads computer, machine, or network device information from the configuration files 109, where the configuration file contains the information of the entire network simulation scenario. The simulator 104 then creates the simulated computer, machine, network device, or other device, including their processes, applications, and file systems, following the order prescribed in the configuration files 109 (block 204). It should be noted that simulated computers, machines, and network devices may be identified by an internet protocol (IP) address. At creation, each computer, machine, network device, and other device starts its services and process in an order defined by the configuration files 109.

A process scheduler functioning within the simulator 109 creates a queue containing all the computers, machines, and network devices in the configuration file 109, and in the same order described therein, and creates these one by one in the scenario storage 108. As shown by block 206, the simulator 104 then determines if there is another computer, machine, or network device within the configuration files 109 that is to be simulated. If there is another computer, machine, or network device within the configuration files 109 that is to be simulated, the functionality of block 202 is repeated. Alternatively, if there is no other computer, machine, or network device within the configuration files 109 that is to be simulated the simulator determines if there is a virtual process waiting for system call (syscall) execution (block 208).

Again, the simulator 104 will read from the configuration files 109 and prepare a queue with all the virtual processes that run on the startup of the simulated machines, computers, and devices. The order of the queue is defined by, first having all the virtual processes for the first computer, machine, or device in the configuration file, second the second virtual process for the first computer, machine, or device in the configuration file 109, and so forth until all the virtual processes in the startup list of the first simulated computer, machine, or network device have been exhausted. Then it will continue in the same fashion with the second computer, machine, or device in the configuration file, and its first virtual process. Eventually, all virtual processes in the startup of all the computers, machines, or devices will have been executed.

A software process, such as, for example, a program, a module, or a service, usually interacts with certain resources, such as, but not limited to, a file in disk, a screen, a networking card, a printer, and other resources. Processes can access these resources through system calls, also referred to as syscalls. These syscalls are requests services from the operating system, usually identified services with the lower layer of communication between a user more process and the operating system kernel. Different operating systems implement syscall services differently, sometimes depending on the architecture of the processor. In other words, a syscall is a request made to an operating system, which typically causes changes in the computer that the operating system runs and the syscall may return an answer. Syscalls are classified by number, and the arguments are passed either through the stack, registers, or a mix of both.

An example of a system and method for executing syscalls is described in U.S. patent entitled, "Distributed Computing Using Syscall Proxying," by Caceres, et al., filed on Jul. 16, 2003, and having U.S. Pat. No. 7,277,937 (hereafter, "the '937 patent"), the disclosure of which is hereby incorporated by reference in its entirety.

In order to simulate all computers, machines, network devices, and other devices efficiently and not get into race conditions between the devices, the virtual process scheduler running within the simulator 104 handles which virtual process and instruction runs in each available thread of execution. As an example, a single thread iterates over a sequence that includes all computers, machines, network devices, and other devices in the order prescribed by the configuration files 109. This order follows the first queue previously described (i.e., each machine or device is created in the order defined by the configuration files). Also, for each simulated computer, machine, network device, and other device, the virtual process scheduler iterates over all of its running virtual processes. Again, the virtual process scheduler will follow the second queue previously described (e.g., first process for first computer, second process for first computer, . . . , first process for second computer, etc.).

As is shown by block 212, if there is no virtual process waiting for syscall execution, the simulator 104 continues to wait for a virtual process that requires syscall execution. If there is a virtual process waiting for syscall execution the virtual process scheduler selects a virtual process for execution in accordance with a predefined virtual process schedule, as defined by the configuration files 109 (block 210). The syscall is then executed for the selected virtual process (block 214). After executing the syscall, the simulator 104 then checks if there is another virtual process waiting for syscall execution (block 208).

The invention further provides a method for developing virtual processes, so that the user can simulate any process run in a real environment. Explicitly, new processes can be developed for the invention using a custom-built, smaller, libc. A C standard library (also known as libc) is a now-standardized collection of header files and library routines used to implement common operations, such as input/output and string handling, in the C programming language. This library implements the most common functions used in the C programming language (e.g., read, write, open) and allows any developer to implement his own services (e.g., an Apache server) with the standard development tools (because this is typically done in the C programming language). These services (linked with those provided by libc) can be used within the simulator 104. To develop a virtual service, a user would need to compile the source code for a program, written in the C language, with a C compiler (e.g., gcc) but using the libc provided by the invention (instead of the standard libc).

It should be noted that the system 100 could simulate the running of more than one program or application simultaneously using, for example, several threads of execution. An example of this happens, when the penetration testing framework is able to exploit a vulnerability and install an agent in a simulated computer, machine, or network device, as is described in detail herein. This agent will run in a new thread, and execute virtual processes as commanded by the user. This example is described in detail hereinafter.

With the virtual network established by the simulator 104, the virtual network may be tested in accordance with the present invention. Programs and processes associated with the simulated network are run. The programs, modules, and processes are sequences of instructions, some of which are system calls, or cause system calls to be executed. These programs, modules, and processes are run, either because they are included in the simulation by the configuration files or in reaction to a system call executed by the penetration testing framework 106.

The instructions that are not system calls are related to common computer functionalities that do not require interaction with the environment (e.g., network, file system). Examples of such common functionalities include, but are not limited to, applying arithmetic operations to constants and operating with data strings. In particular, those processes that are scheduled to run on the startup of each machine, computer, and network device might have open services. Examples of such open service include, but are not limited to, HTTP, SSH, and FTP. For each open service within the network simulation, the open service requires a socket listening in an open port. The simulator 104 provides the socket listening in an open port of a simulated computer for each open service of the simulated computer. It should be noted that each open service of the simulated computer is assigned a separate socket. As is known by those skilled in the art, a socket is an end-point of a bidirectional process-to-process communication flow across an IP based network, such as the Internet. Within the present system and method, sockets act as an interface between services in the simulated computers and the penetration testing framework 106.

For testing of the simulated network and elements therein, the user of the present system 100 begins with information gathering. To perform information gathering, the user uses the penetration testing framework 106 to interact with the simulator 104. With each information gathering module run by the penetration testing framework 106, as requested by the user, the penetration testing framework 106 will execute programs constituted of one or more syscalls in the simulated computers. That is, the penetration testing framework 106 will send a sequence of syscalls to a specific simulated computer in the simulated scenario. It should be noted that the penetration testing framework 106 designates a socket for each syscall being sent to a simulated computer.

As previously mentioned, the simulator 104 contains code that allows the simulator 104 to answer to syscalls. The answers are the same answers that a real computer would return when prompted with the same syscall. As an example, when the user is scanning for open ports in a simulated computer, the user will pick a port scanning module from the penetration testing framework 106. The penetration testing framework 106 will open a socket for writing, issue a sequence of syscalls, and send the sequence to the target simulated computer. The simulator 104 will receive the sequence of syscalls. If the socket is closed then the penetration testing framework 106 will receive no answer, thereby meaning that the underlying service is unavailable. If the socket is open, the simulator 104 will provide answers for these syscalls. The answers are written in the respective socket in the penetration testing framework 106.

As a result of the abovementioned, the user will run standard information gathering modules much like he would with a real network. In particular, the user will learn which processes and services are being run in the simulated computers, the versions for these processes and services, and subsequently might infer which of these services is vulnerable to an exploit. The penetration testing framework 105 might contain logic that allows it to answer, for each open service, which of the available exploits within the exploit database 105 might be used to compromise the underlying computer.

Once the user has identified a potentially vulnerable service, the user will command the penetration testing framework 106 to send an exploit to a given socket of a simulated computer. This will cause the penetration testing framework 106 to open a socket and send a "write" system call with a data string containing an identification of the exploit to the simulator 104 targeting a specific service and computer that it hosts. If the socket for the given simulated computer and service is open, the simulator 104 will execute the read syscall for the target computer with the same message. This message contains a special identification string that univocally identifies the exploit. The simulator 104 then queries the exploits database 105 with this special identification. The answer for this query determines a conditional probability distribution that specifies for each environment condition what should be the result of the exploit (e.g., success, crash the system, crash the application). The environment conditions are all the information that can influence the success of the exploit, which include the configuration of the computer and connectivity of the computer. With this information, the simulator 104 will decide whether the exploit is successful or if it is not.

If the exploit was successful, the simulator 104 will note that an agent was installed in the target computer, resulting in a change in the scenario. Agents hosted in a simulated machine run inside a different independent process and are handled by the simulator 104 like any regular process. As it happens with reality, the agent may hold the credentials and privileges of the process that the agent compromised, or in any case, may not hold full administration privileges. For example, the user might be able to execute arbitrary syscalls in the compromised simulated computer. Prior to this, the user could execute a restricted set of syscalls in the simulated computer, as it happens with real computers before they are compromised.

FIG. 3 is a flow chart illustrating a port scan process necessary for virtual network testing, in accordance with the present system and method. Referring to block 300, the simulator 104 is started and ready for interaction to assist with port scanning. The simulator then enters into an idle state waiting for commands (module execution) to be received (block 302). A user of the present system and method, also referred to herein as a penetration tester, then executes the port scanner module from the penetration testing framework graphical user interface 112 (block 304). The penetration tester then chooses one or several IP addresses and ports of computers, machines, or network devices to scan from the penetration testing framework graphical user interface 112 (block 306)

As shown by block 308, the penetration testing framework 106 then determines if there is an IP address to scan. If there is no IP address to scan, the port scan module is finished (block 324) and the simulator 104 again enters into the idle state waiting for commands (block 302). Alternatively, if there is an IP address to scan, the penetration testing framework selects an IP address X from the list previously entered by the penetration tester in block 306 (block 310).

As shown by block 312, the penetration testing framework then determines if there is a port of a computer, machine, or network device to scan. If there is no port to scan, the penetration tester again determines if there is an IP address to scan (block 308). Alternatively, if there is a port to scan, the penetration testing framework selects a port Y from the list of selected ports previously entered by the penetration tester shown by block 306 (block 314).

The penetration testing framework then requests syscall connect execution with the parameters (X, Y) (block 316). The simulator 104 then executes the syscall connect (block 318). A determination is then made to see if the syscall connection was successful (block 320). Specifically, if an answer to the syscall connect is received by the penetration testing framework 106 from the simulator 104, then the syscall connection was successful.

If the connection was not successful, the penetration testing framework again determines if there is a port to scan, as shown by block 312. Alternatively, if the connection was successful, the penetration testing framework is informed that port Y is open in computer, machine, or network device X (block 322).

At this point, the penetration testing framework 106 is aware of open ports on a specific computer, machine, or network device. FIG. 4 is a flow chart illustrating a simulated exploit process performed by using the present system 100. Referring to block 400, the simulator 104 is started and ready for interaction to test the virtual network. As previously mentioned, an information gathering step is performed (block 401) where the user runs standard information gathering modules much like he would with a real network. In particular, the user learns which processes and services are being run in the simulated computers, machines, or network devices, the versions for these processes and services, and subsequently might infer which of these services is vulnerable to an exploit. The penetration testing framework 105 contains logic that allows it to answer, for each open service, which of the available exploits within the exploit database 105 might be used to compromise the underlying computer, machine, or network device.

The simulator 104 then enters into an idle state waiting for commands (module execution) to be received (block 402). Since the user has identified a potentially vulnerable service, using the penetration testing framework graphical user interface 112, the user commands the penetration testing framework 106 to send an exploit to a given socket of a simulated computer, machine, or network device (block 404).

The penetration tester then chooses the IP address X and the port number Y to launch the attack (block 406). The penetration testing framework 106 then requests syscall connect execution with the parameters (X,Y) (block 408). As shown by block 410, the simulator 104 then executes the syscall connect on computer, machine, or network device X so that the exploit may be sent to the simulated computer, machine, or network device.

The penetration testing framework 106 then determines if the connection is successful (block 412). If the connection was not successful, the penetration testing framework 106 informs the user that the attack failed (block 426). Alternatively, if the connection was successful, the penetration testing framework 106 requests syscall write execution using an identification for the exploit (block 414). The simulator then executes the syscall write on machine, computer, or network device X (block 416).

The simulator 104 then reads the exploit identification, searches the identification in the exploits database 105, and evaluates the attack success (block 418). A determination is then made to see if the attack was successful (block 420). If the attack was not successful, the penetration testing framework 106 informs the user that the attack failed (block 426), after which the simulator 104 again enters an idle state waiting for commands (module execution) (block 402). Alternatively, if the attack was successful, the simulator 104 deploys an agent in the compromised machine, computer, or network device X (block 422). The penetration testing framework 106 then informs the user of the system 100 that the attack was successful (block 424), after which the simulator 104 again enters an idle state waiting for commands (module execution) (block 402).

It should be noted that the present system and method does not require the penetration testing framework to provide feedback to the simulator, but instead the simulator may run virtual processes as previous stored within the configuration files.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A method of providing computer network attack simulation on a computer, comprising the steps of:
   receiving a network configuration, a network setup description, and a penetration testing framework with a local agent installed in the penetration testing framework;
   simulating the network based on the received network configuration, wherein the simulated network contains at least one of the group consisting of a simulated computer, a simulated machine, and a simulated network device;
   receiving a remote agent running in one simulated computer of the simulated network and connected to the penetration testing framework through the local agent;
   receiving a simulated exploit for compromising the at least one simulated computer, simulated machine, or simulated network device;
   querying an exploit database with a property of said simulated exploit;
   receiving an exploit outcome probability from said exploit database in response to said querying;
   determining an outcome of the simulated exploit for compromising the at least one simulated computer, simulated machine, or simulated network device based on said exploit outcome probability; and
   when the outcome of the simulated exploit is compromising the simulated computer, simulated machine, or simulated network device, virtually installing a remote agent on the at least one simulated computer, simulated machine, or simulated network device, wherein the remote agent allows a user to execute arbitrary operating system calls on the at least one simulated computer, simulated machine, or simulated network device from the local agent.

2. The method of claim 1, further comprising the step of executing the arbitrary operating system calls on the simulated computer to analyze risk to which the network may be exposed.

3. The method of claim 1, wherein the network configuration is provided by a configuration file.

4. The method of claim 3, wherein the configuration file contains a template that is used for at least a portion of the at least one simulated computer, simulated machine, or simulated network device.

5. The method of claim 3, wherein the configuration file describes which simulated computers are in the simulated network, and at least one of what applications and services are run by the simulated computers, what operating systems are run by the simulated computers, and how the simulated computers are connected through the network.

6. The method of claim 1, wherein more than one simulator is used to perform the step of simulating the network configuration.

7. The method of claim 6, wherein a simulator monitor provides management and administrative operations for each simulator.

8. The method of claim 7, wherein a graphical user interface connected to the simulator allows a user of the present method to view information provided by the simulator monitor.

9. The method of claim 1, wherein the network configuration includes at least two simulated computers that communicate with each other.

10. The method of claim 1, further comprising the step of issuing arbitrary operating system calls from the local agent so that the arbitrary operating system calls are executed on the simulated computer and their answer is returned to the local agent to allow the execution of modules within the penetration testing framework.

11. The method of claim 1, wherein the outcome is selected from the group consisting of compromising the system, crashing the system, and doing nothing.

* * * * *